Aug. 27, 1940.　　　　E. J. WITCHGER　　　　2,212,910
MICROMETER GAUGE
Filed Jan. 3, 1939

INVENTOR.
EUGENE J. WITCHGER
BY George B. Willcox
ATTORNEY.

Patented Aug. 27, 1940

2,212,910

UNITED STATES PATENT OFFICE 2,212,910

MICROMETER GAUGE

Eugene J. Witchger, Saginaw, Mich., assignor to The Lufkin Rule Company, Saginaw, Mich., a corporation of Michigan Application January 3, 1939, Serial No. 249,038

1 Claim. (Cl. 33—164)

This invention relates to micrometer gauges and similar instruments and pertains more particularly to an improved means for clamping the gauging spindle of the instrument to a rotating barrel that actuates the spindle.

Because of wear on the anvil and on the end of the measuring spindle in an instrument of this kind the original zero reading of the scale on the sleeve will become inaccurate. Customarily the anvil and the end of the spindle are then faced off to present new fair faces. The setting of the scale must then be justified to give a correct zero reading when the spindle is firmly contacting the anvil. A difficulty long recognized by manufacturers and users of micrometer gauges has been the amount of care and the skillful handling required in reassembling the parts after grinding, and in tightening them together again. The chief difficulty has been due to the devices heretofore employed to clamp the spindle and the rotating sleeve together. Those devices were usually made so that final tightening of the clamping device caused shifting of the sleeve relatively to the spindle after they had been carefully set in a preliminary way to the proper place. Furthermore, the considerable stress needed to tighten the parts so as to prevent their shifting in use of the instrument would set up a torque, a warp, or twisting strains, which by reason of their design, caused the clamping elements themselves to disturb the accurate pre-arrangement of the parts.

The purpose of this invention is to provide a clamping device which, although in general performing the same functions, shall avoid all the difficulties above mentioned, yet can be produced at comparatively low cost, is positive in its clamping action, and is so arranged that it will not throw the rotating barrel out of axial alinement with the spindle, nor cause any shifting of the parts while receiving its final tightening stress.

With the foregoing and certain other objects in view which will appear later in the specifications, my invention comprises the devices described and claimed and the equivalents thereof.

Figure 1:
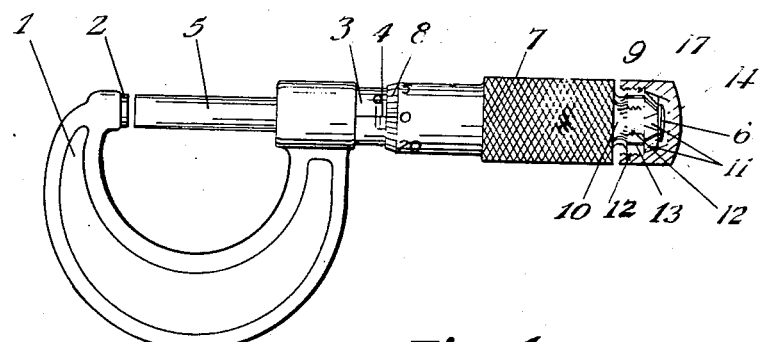
Fig. 1 is a side view of a conventional micrometer gauge, the view being partly in section to show the arrangement of parts embodying the present improvement.
Figure 6:
Fig. 6 is a side view of the threaded spindle of the micrometer.

Referring first to the features of a conventional micrometer gauge illustrated in Fig. 1, numeral 1 designates the frame, 2 the anvil, and 3 the tubular barrel inscribed with a longitudinal scale 4. A gauging spindle 5, Fig. 6, with threads extending to its end 6 is screwed into a portion 3a, Fig. 2, of the barrel 3 to engage a work piece in the usual way.

Figure 2:
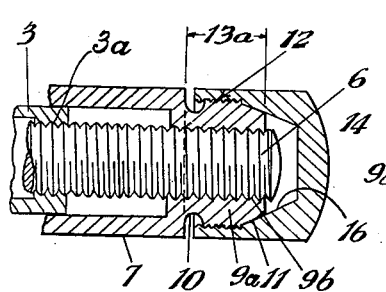
Fig. 2 is an enlarged sectional view of the said parts, the section being taken on the line 2—2 of Fig. 4.

A tubular sleeve 7 is telescoped over the barrel 3, the outer end of the sleeve being internally threaded, as at 9b, Fig. 2, to receive the threaded end of spindle 5 which projects beyond the barrel 3. The free end of sleeve 7 is beveled and bears a circumferential scale 8 that coacts with longitudinal scale 4 on barrel 3 for measuring work pieces between anvil 2 and spindle 5.

Figure 4:
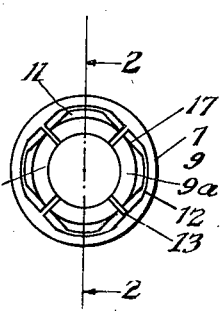
Fig. 4 is an end view of the parts shown in Fig. 2, without the cap.
Figure 5:
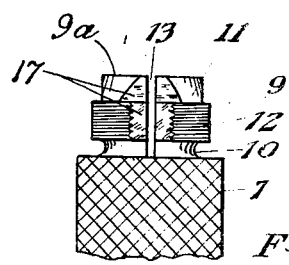
Fig. 5 is a side view of the spindle-clamping device without the cap.

The present improvement pertains to the part of the instrument remote from frame 1, being illustrated particularly in Figs. 1, 2, and 5. Its primary function is to render easy and convenient the standardizing or calibrating of the instrument so as to show a proper zero reading when the working faces of anvil 2 and spindle 5 are in contact and pressed together by an amount of rotational effort on the knurled sleeve 7 which the operator's fingers recognize as being about normal or "right" for his use. The means whereby such easy calibration is attained in a better way than heretofore, and their function and mode of operation are as follows:

The outer end portion of sleeve 7, designated generally by numeral 9 is of reduced diameter, and where it joins the sleeve is a peripheral groove 10, preferably semi-circular in section. Part 9 has its end tapered to present the frustum of a cone 11. It also has external threads 12 intermediate the groove 10 and the conical end 11, and is threaded internally to take the threaded portion 6 of spindle 5. Moreover, part 9 is divided by slits 13 into several sector-like members 9a, 9a, as shown in Fig. 4. The slits pass through cone 11, threaded portion 12, and cross the groove 10, the length of the slits being indicated at 13a, Fig. 2.

Spindle 5 is precisely alined coaxially with sleeve 7 when the two are screwed together as in Fig. 2, and their threads are in close but easy running engagement so that either can be rotated freely on the other.

If all the members 9a, four in number in the example illustrated, are urged radially inward simultaneously the spindle and sleeve can be clamped together as one piece, but it will be apparent that the coaxial alinement of the spindle and the sleeve will not be preserved unless the clamping means is so designed and constructed as to prevent any erratic warping of the parts when they are stressed.

A feature of my improvement is found in the structure and mode of operation of a novel combination of known devices that comprise such an advantageous clamping means.

Precision instruments of the kind under consideration are required to possess certain desirable characteristics among which are the following: The sleeve and spindle must be as exactly coaxial after clamping as they were before, in order that the free beveled end of the sleeve 7 carrying the peripheral scale 8 shall not wobble when the sleeve is rotated on the barrel 3. Hence each member 9a must be urged inwardly exactly the same as its companions. Although such inward movement is very slight, it should be in an exactly radial direction toward the axis of the spindle and there should be no warping or twisting effects which might result in gripping the spindle unevenly. The parts 9a should be capable of being urged into clamping position by applying to them relatively small compressive force, permitting the user to clamp the sleeve to the spindle by a slight effort of the thumb and finger, appropriate to the general sensitiveness of the instrument for taking fine measurements.

My device for actuating the clamping members 9a will now be described.

Figure 3:
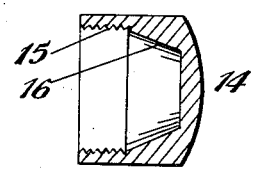
Fig. 3 is a longitudinal section of the cap member.

A cap 14, detailed in Fig. 3, is provided with an internally threaded rim 15 to take the external threads 12 of members 9a. Both threads, being on cylindrical bodies are "straight," that is, they do not cause any inward compressing action upon the members 9a.

Cap 14 also has a recess with conical wall, 16, shaped to fit and bear down upon the conical parts 11 of the members 9a shown in Figs. 2 and 5.

Referring to Fig. 5, it will be observed that the outer walls of sectors 9a are cut away crosswise of the slits 13 so that only a fractional threaded area 12 remains on the mid portion of each member 9a and also that the middle portions only of the cone faces 11 remain to be engaged by the conical wall 16 of the cap.

The cut-away portions 17 insure that the conical wall 16 of cap 14 shall act against the tapered surfaces of the segment shaped members 9a solely with a radial inward push and that this force shall be applied solely to the middle parts of the segments. Consequently the threaded members 9a are urged against the threaded spindle 6 fairly and evenly, and without any such unsymmetrical clamping effects as would be produced should the members 9a be pressed in unevenly or become slightly distorted, sprung, twisted or warped. The grooves 10 improve the yielding equality of the members 9a.

Another advantageous feature of the cut-away portions 17 is that the ends of the threads on each member 9a are thereby made bevel ended instead of abrupt and so can not scrape, cut or wear the threads 15 in cap 14. Similarly, the correspondingly cut away portions of the tapered walls 11 on members 9a insure that all clamping forces applied to those members by the conical face 16 of cap 14 shall be directed radially inward and shall be applied to the mid-length of each arcuate conical face 11. The clamping forces may be considered as being applied along a line such as 2—2, Fig. 4, and it will now be apparent that cap 14 can be screwed onto the part 9 and tightened down without any risk of either disturbing the coaxial alinement of spindle 5 and sleeve 7 or of changing the positions of the barrel, sleeve and spindle relatively to each other.

To assemble the parts and adjust the instrument to take correct micrometer readings, the procedure is as follows:

Spindle 5 is inserted in barrel 3, its screw 6 threaded into bore 3a of the barrel, see Fig. 2, until the end of spindle 5 has contacted anvil 2 tightly enough to secure frame 1 and its barrel 3 to spindle 5, temporarily. Sleeve 7 is slipped over the barrel 3 telescopically, its internal threads 9b being screwed on the end 6 of spindle 5 until the scale graduations 4, 8, Fig. 1, indicate zero. Keeping the barrel and sleeve in such zero position, the user applies cap 14 to the threaded projection 9 and screws it down until the wall 16 touches the tapered faces 11 of the several members 9a in the manner shown in Fig. 2.

Cap 14 is thereupon tightened slightly to secure barrel 3 to the threaded end of spindle 5 by moderate clamping engagement so that subsequent handling during the adjusting operation shall not shift sleeve 7 with respect to spindle 5. Up to this time the spindle 5 and anvil 2 have been in contact face to face. Now spindle 5 is backed away from anvil 2 by rotating sleeve 7 in the unscrewing direction, the spindle and the sleeve being held together in a preliminary way by cap 14. Frame 1 and barrel 3 are no longer fixed to spindle 5 since the contact of anvil 2 with the spindle has been released. Hence the frame 1, by swinging or other movements can not disturb the relationship established between spindle 5, sleeve 7, and cap 14, now united as a unit.

Irrespective of the frame 1, the user then holds sleeve 7 in one hand and with the other screws cap 14 down securely, or he may use a small spanner wrench on the cap. When screw 7 is rotated to bring the anvil and spindle again into contact with the appropriate degree of pressure it will be seen that the scales 4, 8 will have come exactly to the desired zero reading and the instrument is ready for use.

Having thus described my invention, what I claim and desire to secure by Letters Patent is:

In a micrometer gauge having a gauge spindle received in a sleeve which is provided with a reduced portion, slotted lengthwise, conical at its extremity and threaded exteriorly: parts of said exteriorly threaded portion being cut away and presenting flat surfaces lying in planes that are substantially perpendicular with and intersect the respective slots and also interrupt the threads at the ends of such flats, the ends of the interrupted threads being beveled in the direction of their length in the planes of the respective flats.

EUGENE J. WITCHGER.